United States Patent [19]

Armijo

[11] 4,045,288
[45] Aug. 30, 1977

[54] NUCLEAR FUEL ELEMENT

[75] Inventor: Joseph Sam Armijo, Saratoga, Calif.

[73] Assignee: General Electric Company, San Jose, Calif.

[21] Appl. No.: 522,766

[22] Filed: Nov. 11, 1974

[51] Int. Cl.² .............................................. G21C 3/20
[52] U.S. Cl. ...................... 176/82; 176/68; 176/78
[58] Field of Search ............... 176/68, 82, 78, 91 R, 176/91 SP; 29/194, 196.2, 196.6, 198

[56] References Cited

U.S. PATENT DOCUMENTS

| | | | |
|---|---|---|---|
| 2,908,966 | 10/1959 | Wagner | 29/194 |
| 2,927,071 | 3/1960 | Huey | 176/82 |
| 2,928,168 | 3/1960 | Gray | 176/91 R |
| 3,136,051 | 6/1964 | Quinlan et al. | 176/82 |
| 3,145,150 | 8/1964 | Gylfe | 176/82 |
| 3,168,399 | 2/1965 | Takahashi et al. | 176/68 |
| 3,184,393 | 5/1965 | Blomeyer et al. | 176/91 R |
| 3,230,150 | 1/1966 | Martin et al. | 176/82 |
| 3,331,748 | 7/1967 | Feraday | 176/82 |
| 3,378,458 | 4/1968 | Ross et al. | 176/68 |
| 3,427,222 | 2/1969 | Biancheria et al. | 176/91 R |
| 3,466,226 | 9/1969 | Lass | 176/68 |
| 3,850,584 | 11/1974 | Bohm et al. | 29/194 |

FOREIGN PATENT DOCUMENTS

| | | | |
|---|---|---|---|
| 933,500 | 8/1963 | United Kingdom | 176/91 R |
| 1,126,396 | 9/1968 | United Kingdom | 176/82 |

Primary Examiner—Samuel W. Engle
Assistant Examiner—S. A. Cangialosi
Attorney, Agent, or Firm—Ivor J. James, Jr.; Sam E. Laub; Samuel E. Turner

[57] ABSTRACT

A nuclear fuel element for use in the core of a nuclear reactor is disclosed and has a composite cladding having a substrate, a metal barrier metallurgically bonded to the inside surface of the substrate and an inner layer metallurgically bonded to the inside surface of the metal barrier. In this composite cladding, the inner layer and the metal barrier shield the substrate from any impurities or fission products from the nuclear fuel material held within the composite cladding. The metal barrier forms about 1 to about 4 percent of the thickness of the cladding and is comprised of a metal selected from the group consisting of niobium, aluminum, copper, nickel, stainless steel, and iron. The inner layer and then the metal barrier serve as reaction sites for volatile impurities and fission products and protect the substrate from contact and reaction with such impurities and fission products. The substrate and the inner layer of the composite cladding are selected from conventional cladding materials and preferably are a zirconium alloy. Also in a preferred embodiment the substrate and the inner layer are comprised of the same material, preferably a zirconium alloy.

19 Claims, 2 Drawing Figures

NUCLEAR FUEL ELEMENT

BACKGROUND OF THE INVENTION

This invention relates broadly to an improvement in nuclear fuel elements for use in the core of nuclear fission reactors, and more particularly to an improved nuclear fuel element having a composite cladding container having a substrate, a metal barrier metallurgically bonded to the inside surface of the substrate and an inner layer metallurgically bonded to the metal barrier.

Nuclear reactors are presently being designed, constructed and operated in which the nuclear fuel is contained in fuel elements which can have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves several purposes and two primary purposes are: first, to prevent contact and chemical reactions between the nuclear fuel and the coolant or the moderator if a moderator is present, or both if both the coolant and the moderator are present; and second, to prevent the radioactive fission products, some of which are gases, from being released from the fuel into the coolant or the moderator or both if both the coolant and the moderator are present. Common cladding materials are stainless steel, aluminum and its alloys, zirconium and its alloys, niobium (columbium), certain magnesium alloys, and others. The failure of the cladding, i.e, a loss of the leak tightness, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to mechanical or chemical reactions of these cladding materials under certain circumstances. Zirconium and its alloys, under normal circumstances, are excellent nuclear fuel claddings since they have low neutron absorption cross sections and at temperatures below about 750° F (about 398° C) are strong, ductile, extremely stable and non-reactive in the presence of demineralized water or steam which are commonly used as reactor coolants and moderators.

However, fuel element performance has revealed a problem with the brittle splitting of the cladding due to the combined interactions between the nuclear fuel, the cladding and the fission products produced during nuclear fission reactions. It has been discovered that this undesirable performance is promoted by localized mechanical stresses due to fuel cladding differential expansion (stresses in the cladding are localized at cracks in the nuclear fuel). Corrosive fission products are released from the nuclear fuel and are present at the intersection of the fuel cracks with the cladding surface. Fission products are created in the nuclear fuel during the fission chain reaction during operation of a nuclear reactor. The localized stress is exaggerated by high friction between the fuel and the cladding.

Within the confines of a sealed fuel element, hydrogen gas can be generated by the slow reaction between the cladding and residual water inside the cladding, and this hydrogen gas may build up to levels which under certain conditions can result in localized hydriding of the cladding with concurrent local deterioration in the mechanical properties of the cladding. The cladding is also adversely affected by such gases as oxygen, nitrogen, carbon monoxide and carbon dioxide over a wide range of temperatures.

The zirconium cladding of a nuclear fuel element is exposed to one or more of the gases listed above and fission products during irradiation in a nuclear reactor and this occurs in spite of the fact that these gases may not be present in the reactor coolant or moderator, and further may have been excluded as far as possible from the ambient atmosphere during manufacture of the cladding and the fuel element. Sintered refractory and ceramic compositions, such as uranium dioxide and other compositions used as nuclear fuel, release measurable quantities of the aforementioned gases upon heating, such as during fuel element manufacture and further release fission products during irradiation. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel.

Thus in light of the foregoing, it has been found desirable to minimize attack of the cladding from water, water vapor and other gases, especially hydrogen, reactive with the cladding from inside the fuel element throughout the time the fuel element is used in the operation of nuclear power plants. One such approach has been to find materials which will chemically react rapidly with the water, water vapor and other gases to eliminate these from the interior of the cladding, and such materials are called getters.

Another approach has been to coat the nuclear fuel material with a ceramic to prevent moisture coming in contact with the nuclear fuel material as disclosed in U.S. Pat. No. 3,108,936. U.S. Pat. No. 3,085,059 describes a fuel element including a metal casing containing one or more pellets of fissionable ceramic material and a layer of vitreous material bonded to the ceramic pellets so that the layer is between the casing and the nuclear fuel to assure uniformly good heat conduction from the pellets to the casing. U.S. Pat. No. 2,873,238 describes jacketed fissionable slugs of uranium canned in a metal case in which the protective jackets or coverings for the slugs are a zinc-aluminum bonding layer. U.S. Pat. No. 2,849,387 discloses a jacketed fissionable body comprising a plurality of open-ended jacketed body sections of nuclear fuel which have been dipped into a molten bath of a bonding material giving an effective thermally conductive bond between the uranium body sections and the container (or cladding). The coating is disclosed as any metal alloy having good thermal conduction properties with examples including aluminum-silicon and zinc-aluminum alloys. Japanese Pat. Publication No. SHO 47-46559 dated Nov. 24, 1972, discloses consolidating discrete nuclear fuel particles into a carbon-containing matrix fuel composite by coating the fuel particles with a high density, smooth carbon-containing coating around the pellets. Still another coating disclosure is Japanese Pat. Publication No. SHO 47-14200 in which the coating of one of two groups of pellets is with a layer of silicon carbide and the other group is coated with a layer of pyrocarbon or metal carbide.

The coating of nuclear fuel material introduces reliability problems in that achieving uniform coatings free of faults is difficult. Further, the deterioration of the coating can introduce problems with the long-lived performance of the nuclear fuel material.

U.S. Pat. application Ser. No. 330,152 filed Feb. 6, 1973 discloses a method for preventing corrosion of nuclear fuel cladding consisting of the addition of a metal such as niobium to the fuel. The additive can be in the form of a powder, provided the subsequent fuel processing operation does not oxidize the metal, or incorporated into the fuel element as wires, sheets or other forms in, around, or between fuel pellets.

Document GEAP-4555 dated Feb., 1964 discloses a composite cladding of a zirconium alloy with an inner lining of stainless steel metallurgically bonded to the zirconium alloy, and the composite cladding is fabricated by use of extrusion of a hollow billet of the zirconium alloy having an inner lining of stainless steel. This cladding has the disadvantage that the stainless steel develops brittle phases, and the stainless steel layer involves a neutron absorption penalty of about ten to fifteen times the penalty for a zirconium alloy layer of the same thickness.

U.S. Pat. No. 3,502,549 discloses a method protecting zirconium and its alloys by the electrolytic deposition of chrome to provide a composite material useful for nuclear reactors. A method for eletrolytic deposition of copper on Zircaloy - 2 surfaces and subsequent heat treatment for the purpose of obtaining surface diffusion of the electrolytically deposited metal is presented in *Energia Nucleare* Volume 11, No. 9 (Sept. 1964) at pages 505–508. In *Stability and Compatibility of Hydrogen Barriers Applied to Zirconium Alloys* by F. Brossa et al (European Atomic Energy Community, Joint Nuclear Research Center, EUR 4098e 1969), methods of deposition of different coatings and their efficiency as hydrogen diffusion barriers are described along with an Al-Si coating as the most promising barrier against hydrogen diffusion. Methods for electroplating nickel on zirconium and zirconium tin alloys and heat treating these alloys to produce alloy-diffusion bonds are disclosed in *Electroplating on Zirconium and Zirconium-Tin* by W. C. Schickner et al (BMI-757, Technical Information Service, 1952). U.S. Pat. No. 3,625,821 presents a fuel element for a nuclear reactor having a fuel cladding tube with the inner surface of the tube being coated with a retaining metal of low neutron capture cross section such as nickel and having finely dispersed particles of a burnable poison disposed therein. *Reactor Development Program Process Report* of August, 1973 (ANL-RDP-19) discloses a chemical getter arrangement of a sacrificial layer of chromium on the inner surface of a stainless steel cladding.

Another approach has been to introduce a barrier between the nuclear fuel material and the cladding holding the nuclear fuel material as disclosed in U.S. Pat. No. 3,230,150 (copper foil), German Pat. Publication DAS 1,238,115 (titanium layer), U.S. Pat. No. 3,212,988 (sheath of zirconium, aluminum or beryllium), U.S. Pat. No. 3,018,238 (barrier of crystalline carbon between the $UO_2$ and the zirconium cladding), and U.S. Pat. No. 3,088,893 (stainless steel foil). While the barrier concept proves promising, some of the foregoing references involve incompatible materials with either the nuclear fuel (e.g., carbon can combine with oxygen from the nuclear fuel), or the cladding (e.g., copper and other metals can react with the cladding, altering the properties of the cladding), or the nuclear fission reaction (e.g., by acting as neutron absorbers). None of the listed references disclose solutions to the recently discovered problem of localized chemical-mechanical interactions between the nuclear fuel and the cladding.

Further approaches to the barrier concept are disclosed in U.S. Pat. No. 3,969,186, issued July 13, 1976 (refractory metal such as molybdenum, tungsten, rhenium, niobium and alloys thereof in the form of a tube or foil of single or multiple layers or a coating on the internal surface of the cladding), and U.S. patent application Ser. No. 441,133, filed Feb. 11, 1974 now U.S. Pat. No. 3,925,151 (liner of zirconium, niobium, or alloys thereof between the nuclear fuel and the cladding with a coating of a high lubricity material between liner and the cladding).

Accordingly, it has remained desirable to develop nuclear fuel elements minimizing the problems discussed above.

SUMMARY OF THE INVENTION

A particularly effective nuclear fuel element for use in the core of a nuclear reactor has a composite cladding having a substrate, a metal barrier metallurgically bonded to the inside surface of the substrate and an inner layer metallurgically bonded to the inside surface of the metal barrier. The substrate of the cladding is completely unchanged in design and function from previous practice for a nuclear reactor and is selected from conventional cladding materials such as zirconium alloys. The metal barrier and the inner layer form a shield between the substrate and the nuclear fuel material held in the cladding. The metal barrier preferably forms about 1 to about 4 percent of the wall thickness of the cladding and is comprised of a low neutron absorption metal selected from the group consisting of niobium, aluminum, copper, nickel, stainless steel and iron. The inner layer and the metal barrier give a preferential reaction site for reaction with volatile impurities or fission products present inside the nuclear fuel element and in this manner serves to protect the cladding from exposure to and attack by the volatile impurities or fission products. Methods of manufacturing the composite cladding are also presented including (1) fitting a tube of the metal barrier inside a hollow billet of the substrate and a tube of the inner layer insie the metal barrier tube, explosively bonding the tubes to the billet and extruding the composite followed by tube reduction, (2) fitting a tube of the metal barrier inside a hollow billet of the substrate and a tube of the inner layer inside the metal barrier tube, heating the tubes and the billet under compressive stress to give diffusion bonding between the tubes and the billet and extruding the composite followed by tube reduction, and (3) fitting a tube of the metal barrier inside a hollow billet of the substrate and a tube of the inner layer inside the metal barrier tube, and extruding the composite followed by tube reduction. This invention has the striking advantage that the substrate of the cladding is protected from contact with fission products, corrosive gases, etc., by the inner layer and the metal barrier and the metal barrier does not introduce any appreciable neutron capture penalties, heat transfer penalties or fuel-barrier incompatibility problems.

OBJECTS OF THE INVENTION

It is an object of this invention to provide a nuclear fuel element capable of operating in nuclear reactors for extended periods of time without the occurrence of splitting of the cladding, corrosion of the cladding, or other fuel failure problems.

It is another object of this invention to provide a nuclear fuel element with a composite cladding having a substrate, a metal barrier metallurgically bonded to the inside surface of the substrate and an inner layer metallurgically bonded to the inside surface of the metal barrier so that the metallurgical bonds provide a long lived connection between the substrate and the metal barrier and between the metal barrier and the inner layer.

Still another object of this invention is to provide a nuclear fuel element having a composite cladding with the substrate metallurgically bonded to the metal barrier and the metal barrier metallurgically bonded to the inner layer with the metal barrier being comprised of a metal selected from the group consisting of niobium, aluminum, copper, nickel, stainless steel and iron.

Another object of this invention is to provide an economical process for producing a composite cladding for a nuclear fuel element using metal extrusion and tube reduction.

The foregoing and other objects of this invention will become apparent to a person skilled in the art from reading the following specification and the appended claims with reference to the accompanying drawings described immediately hereinafter.

DESCRIPTION OF THE INVENTION

Figure 1:
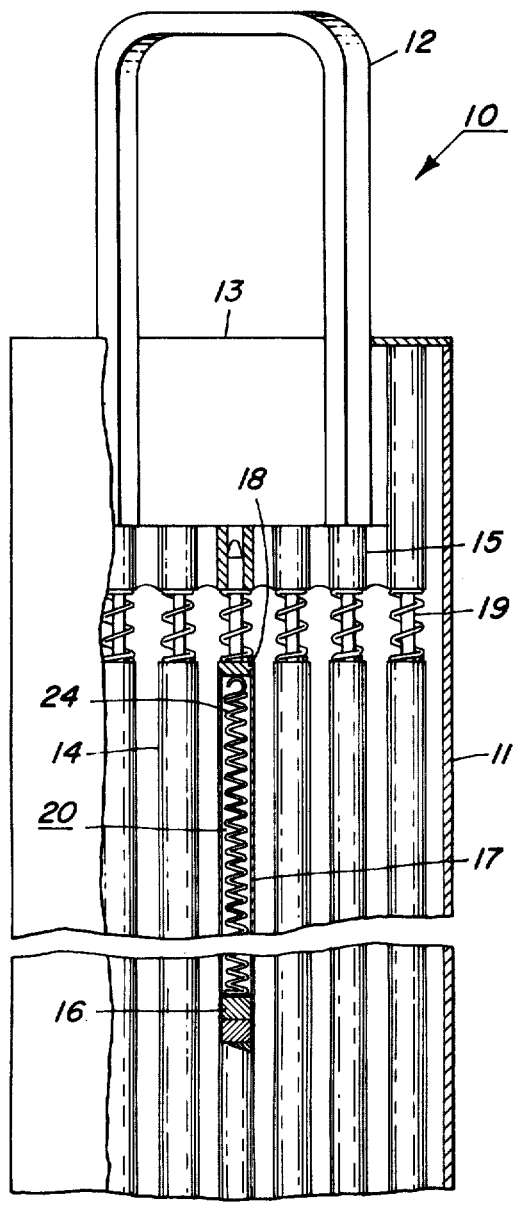
FIG. 1 is a partial cutaway sectional view of a nuclear fuel assembly containing nuclear fuel elements constructed according to the teaching of this invention.

Referring now more particularly to FIG. 1, there is shown a partially cutaway sectional view of a nuclear fuel assembly 10. This fuel assembly 10 consists of a tubular flow channel 11 of generally square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements or rods 14 is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at an elevated temperature.

The nuclear fuel elements or rods 14 are sealed at their ends by means of end plugs 18 welded to the cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restraint against the axial movement of the pellet column, especially during handling and transportation of the fuel element.

The fuel element is designed to provide an excellent thermal contact between the cladding and the fuel material, a minimum of parasitic neutron absorption and resistance to bowing and vibration which is occasionally caused by flow of the coolant at high velocity.

A nuclear fuel element or rod 14 is shown in a partial section in FIG. 1 constructed according to the teachings of this invention. The fuel element includes a core or central cylindrical portion of nuclear fuel material 16, here shown as a plurality of fuel pellets of fissionable and/or fertile material positioned within a structural cladding or container 17. In some cases the fuel pellets may be of various shapes such as cylindrical pellets or spheres, and in other cases different fuel forms such as a particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide.

Figure 2:
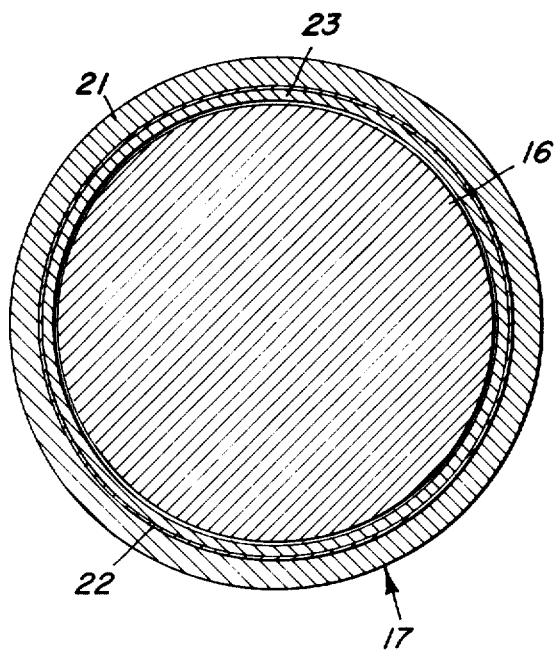
FIG. 2 is an enlarged cross sectional view of the nuclear fuel element in FIG. 2 illustrating the teaching of this invention.

Referring now to FIG. 2, the nuclear fuel material 16 forming the central core of the fuel element 14 is surrounded by a cladding 17 which in this invention is also referred to as a composite cladding. The composite cladding has a substrate 21 selected from conventional cladding materials such as a stainless steel and zirconium alloys and in a preferred embodiment of this invention the substrate is a zirconium alloy such as Zircaloy-2. The substrate 21 has metallurgically bonded on the inside diameter thereof a metal barrier 22 so that the metal barrier forms a shield of the substrate from the nuclear fuel material inside the composite cladding. The metal barrier preferably forms about 1 to about 4 percent of the thickness of the cladding and is comprised of a metal selected from the group consisting of niobium, aluminum, copper, nickel, stainless steel and iron. The metal barrier 22 has metallurgically bonded on the inside diameter thereof an inner layer 23 so that the inner layer is the portion of the composite cladding closest to the nuclear fuel material 16. The inner layer preferably forms about 5 to about 15 percent of the thickness of the cladding and is comprised of conventional cladding materials such as stainless steel and zirconium alloys and in a preferred embodiment of this invention the substrate is a zirconium alloy such as Zircaloy-2. The metal barrier serves as a preferential reaction site for gaseous impurities and fission products which have either diffused through or corroded through the inner layer 23 and protects the cladding from contact and reaction with such impurities and fission products. In another preferred embodiment of this invention, the substrate and the inner layer are comprised of the same material and a preferred material is a zirconium alloy such as Zircaloy-2.

The composite cladding of the nuclear fuel element of this invention has a metal barrier metallurgically bonded to the substrate and an inner layer metallurgically bonded to the metal barrier. Metallographic examination shows that there is sufficient cross diffusion between the substrate and the metal barrier and between the metal barrier and the inner layer to form metallurgical bonds, but insufficient cross diffusion to alloy with the metal barrier itself. Also from FIG. 2 it is apparent that the metal barrier could be termed a "buried" metal barrier.

It has been discovered that a metal barrier of the order preferably of at least about 1 to 4 percent of the wall thickness of the cladding metallurgically bonded to the substrate and the inner layer provides chemical resistance sufficient to prevent propagation of failures from the inner layer to the substrate of the cladding. The metal barrier provides significant chemical resistant to fission products and gases that may be present in the nuclear fuel element and prevents these fission products and gases from contacting the substrate of the composite cladding protected by the metal barrier.

For a typical fuel element the substrate of the composite cladding ranges in thickness from 24 to 30 mils, the metal barrier ranges in thickness from 0.5 to 1 mils and the inner layer is approximately 3 mils.

The composite cladding used in the nuclear fuel elements of this invention can be fabricated by any of the following methods.

In one method a tube of the metal selected to be the metal barrier is inserted into a hollow billet of the material selected to be the substrate, a tube of the material selected to be the inner layer is inserted into the metal barrier tube, and then the assembly is subjected to explosive bonding of the tubes to the billet. The composite is extruded using conventional tube shell extrusion at elevated temperatures of about 1000° to 1400° F (about 538° to 760° C). Then the extruded composite is subjected to a process involving conventional tube reduction until the desired size of cladding is achieved.

In another method, a tube of the metal selected to be the metal barrier is inserted into a hollow billet of the material selected to be the substrate, a tube of the material selected to be the inner layer is inserted into the tube of the metal barrier and then the assembly is subjected to a heating step (such as at 750° C for 8 hours) to give diffusion bonding between the tubes and the billet. The composite is extruded using conventional tube shell extrusion such as described above in the immediately preceding paragraph. Then the extruded composite is subjected to a process involving conventional tube reduction until the desired size of cladding is achieved.

In still another method, a tube of the metal selected to be the metal barrier is inserted into a hollow billet of the alloy selected to be the substrate, a tube of the material selected to be the inner layer is inserted into the metal barrier tube and the assembly is extruded using conventional tube shell extrusion as described above. Then the extruded composite is subjected to a process involving conventional tube reduction until the desired size of cladding is achieved.

The foregoing processes of fabricating the composite cladding of this invention gives economies over other processes used in fabricating cladding such as electroplating or vapor deposition.

The invention includes a method of producing a nuclear fuel element comprising making a composite cladding container which is open at one end, the cladding container having a substrate, a metal barrier metallurgically bonded to the inside surface of the substrate and an inner layer metallurgically bonded to the inside surface of the metal substrate, filling the composite cladding container with nuclear fuel material having a cavity at the open end, inserting a nuclear fuel material retaining means into the cavity, applying an enclosure to the open end of the container leaving the cavity in communication with the nuclear fuel, and then bonding the end of the clad container to said enclosure to form a tight seal therebetween.

The present invention offers several advantages promoting a long operating life for the nuclear fuel element including the reduction of hydriding of the cladding substrate, the minimization of localized stress on the cladding substrate, the minimization of stress and strain corrosion on the cladding substrate, the reduction of the probability of a splitting failure in the cladding substrate and the prevention of the propagation of stress corrosion cracks through the composite cladding. The invention further prevents expansion (or swelling) of the nuclear fuel into direct contact with the cladding substrate, and this prevents localized stress on the cladding substrate, prevents initiation or acceleration of stress corrosion of the cladding substrate and prevents bonding of the nuclear fuel to the cladding substrate.

An important property of the composite cladding of this invention is that the foregoing improvements are achieved with a negligible to moderate neutron penalty (depending on choice of barrier material). Such a cladding is readily accepted in nuclear reactors since the cladding would have minimal eutectic formation (depending on choice of barrier material) in the substrate portion of the cladding during a loss of cooling accident or an accident involving the dropping of a nuclear control rod. Further the composite cladding has a very small heat transfer penalty in that there is no thermal barrier to transfer of heat such as results in the situation where a separate foil or liner is inserted in a fuel element. Also the composite cladding of this invention is inspectable by conventional non-destructive testing methods during various stages of fabrication.

In addition to the foregoing, when the zirconium alloy is selected as the substrate and the inner layer, the inside and outside surfaces of the composite cladding are compatible with manufacturing processes for light water nuclear reactor cladding and this enables the use of current manufacturing procedures, lubricants, etchants, etc.

Those skilled in the art will gain a further understanding of this invention from the following illustrative, but not limiting, examples of this invention.

EXAMPLES 1-4

Billets and inserts were machined, cleaned and assembled by standard procedures for example, and all dimensions were chosen so that the composite billets could be extruded into hot extrusion press.

The billets were normal Zircaloy-2 conforming to ASTM B353, Grade RA-1, and the inserts were made of high purity niobium and 304L Stainless Steel (ASTM-A 312). All billet bores and inserts had an 8 mil per in. taper and were pressed together to ensure a good contact between the mating surfaces. The dimensions of the machined parts were as follows:

|  | Billet | | Buried Barrier | | Inner Diameter Barrier | |
|---|---|---|---|---|---|---|
|  | Length X | Outer Dia. X | Inner X Dia. | Outer Dia. | Inner Dia. | Outer Dia. | Inner Dia. |
| 1. Buried Nb Metal Barrier | 9.5 × | 5.74 × | 2.59 | 2.59 – 2.44 | | 2.44 – 1.66 | |
| 2. Buried Nb Metal Barrier | 9.5 × | 5.74 × | 2.59 | 2.59 – 2.44 | | 2.44 – 1.66 | |
| 3. Buried SS Metal Barrier | 9.5 × | 5.74 × | 2.64 | 2.64 – 2.44 | | 2.44 – 1.66 | |
| 4. Buried SS Metal Barrier | 9.5 × | 5.74 × | 2.56 | 2.56 – 2.44 | | 2.44 – 1.66 | |

Prior to assembling the billets and inserts the mating surfaces were given a light etch to remove traces of impurities.

The etchant used for the Zircaloy-2 was a solution of 70 ml $H_2O$, 30 ml $HNO_3$, and 5 ml HF;

and for the niobium a solution of 7.5 ml HCL, 7.5 ml $H_2SO_4$, 4 ml $HNO_3$, 31 ml $H_2O$, and 2 ml HF.

The stainless steel was polished with fine emery paper and cleaned with acetone and de-ionized water.

To improve the chances for a satisfactory bond between the inserts and the billets during extrusion, it was decided to prebond the assemblies. This was accomplished by pressing the tapered inserts into the tapered bore in the billets in vacuum ≦20 μm while maintaining the billet temperature at 1,400° F for 8 hours. Forces applied to the inserts during initial pressing ranging from 30–45,000 lbs.

To reduce end-losses during the extrusion a 2 inch piece of Zircaloy-2 billet was welded on each end of the composite billets and machined flush.

The extrusion of the billets into the tube shells was done using the following parameters:

Extrusion rate — 6 in/min,

Reduction ratio — 6:1,

Temperature — 1,100° F and

Extrusion force — 3500 tons.

All billet surfaces except the bore and also the floating mandrel were lubricated with a water soluble lubricant which was baked on at 1,300° F for 1 hour. Both ends of the tube shells were cut clean and the inner diameter was honed to remove possible surface flaws and to improve the finish. Final dimensions for the tube shells were:

Outer Diameter — 2.500 inches,

Inner Diameter — 1.640 inches, and

Length — 5 Feet.

The final reduction of the tube shells to fuel tubing followed the standard procedure which includes four reductions with cleaning and annealing between each step. The parameters for this process are listed in Table 1.

TABLE 1

CO-EXTRUDED TUBE REDUCTION PARAMETERS

| Step | Outer Diameter | Thickness of Composite | Inner Diameter Metal Barrier Insert Tube | % Reduction | Qe* |
|---|---|---|---|---|---|
| Start with Tube Shell | 2.500 | .430 | 1.650 | — | — |
| Clean for anneal (degrease - soap base caustic) Anneal - 1250° F - 1 Hour | | | | | |
| First Pass | 1.687 | .270 | 1.147 | 57 | 1.2 |
| Clean for anneal Anneal 1150° F - 1 Hour | | | | | |
| Second Pass | 1.125 | .160 | .805 | 60 | 1.4 |
| Clean for anneal Anneal 1150° F - 1 Hour | | | | | |
| Third Pass | .750 | .085 | .580 | 64 | 1.7 |
| Clean for anneal Anneal 1150° F - 1 Hour | | | | | |
| Fourth Pass | .495 | .028 | .439 | 70 | 2.3 |
| Clean for anneal Anneal 1070° F - 2¼ to 4 Hours Etch to | | | | | |
| | .494 | .028 | .438 | | |

*Qe is defined as the ratio of percentage of change in wall thickness to percentage of change in mean diameter.

Dimensions of the final products are listed in Table 2.

TABLE 2

| | Inner Diameter | Outer Diameter | Dimensions in Mils of | |
|---|---|---|---|---|
| | | | Metal Barrier | Inner Layer |
| Example 1 | 0.438 | 0.494 | 1.0 ± .2 | 3.1 ± 0.6 |
| Example 2 | 0.438 | 0.494 | 1.0 ± .2 | 3.2 ± 0.5 |
| Example 3 | 0.438 | 0.494 | 1.4 ± .2 | 3.6 ± 0.2 |
| Example 4 | 0.438 | 0.494 | 1.0 ± .1 | 3.0 ± 0.2 |

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A nuclear fuel element comprising (a) a central core of a body of nuclear fuel material selected from the group consisting of compounds of uraniun, plutonium, thorium and mixtures thereof and (b) an elongated composite cladding container including an outer portion formed of a material selected from the group of zirconium and zirconium alloys and forming a substrate, an undeformed metal barrier of constant thickness formed of a material selected from the group of niobium, aluminum, copper, nickel, stainless steel and iron metallurgically bonded on the inside surface of the substrate, said metal barrier comprising from about 1 to about 4 percent of the thickness of the cladding container and an undeformed inner layer of constant thickness formed of zirconium metallurgically bonded on the inside surface of the metal barrier, said inner layer comprising from about 5 to about 15 percent of the thickness of the cladding container, said cladding container enclosing said core so as to leave a gap between said core and said cladding during use in a nuclear reactor.

2. The nuclear fuel element of claim 1 which has in addition a cavity inside the fuel element and a nuclear fuel material retaining means comprising a helical member positioned in the cavity.

3. A nuclear fuel element of claim 1 in which the metal barrier is aluminum.

4. A nuclear fuel element of claim 1 in which the metal barrier is copper.

5. A nuclear fuel element of claim 1 in which the metal barrier is niobium.

6. A nuclear fuel element of claim 1 in which the metal barrier is nickel.

7. A nuclear fuel element of claim 1 in which the metal barrier is stainless steel.

8. A nuclear fuel element of claim 1 in which the metal barrier is iron.

9. A nuclear fuel element of claim 1 in which the nuclear fuel material is selected from the group consisting of uranium compounds, plutonium compounds and mixtures thereof.

10. A nuclear fuel element of claim 1 in which the nuclear fuel material is comprised of uranium dioxide.

11. A nuclear fuel element of claim 1 in which the nuclear fuel material is a mixture comprising uranium dioxide and plutonium dioxide.

12. A composite cladding container for nuclear reactors comprising an outer portion forming a substrate and formed of a zirconium alloy, an undeformed metal barrier of constant thickness formed of a material selected from the group of niobium, aluminum, copper, nickel, stainless steel and iron mettallurgically bonded on the inside surface of the substrate, said metal barrier comprising from about 1 to about 4 percent of the thickness of the cladding container and an undeformed inner layer of constant thickness formed of zirconium metallurgically bonded on the inside surface of the metal barrier, said inner layer comprising from about 5 to 15 percent of the thickness of the cladding container metallurgically bonded on the inside surface of the metal barrier.

13. A composite cladding container according to claim 12 in which the metal barrier is aluminum.

14. A composite cladding container according to claim 12 in which the metal barrier is niobium.

15. A composite cladding container according to claim 12 in which the metal barrier is copper.

16. A composite cladding container according to claim 12 in which the metal barrier is nickel.

17. A composite cladding container according to claim 12 in which the metal barrier is stainless steel.

18. A composite cladding container according to claim 12 in which the metal barrier is iron.

19. A nuclear fuel element which comprises an elongated composite cladding container including an outer portion formed of a material selected from the group of zirconium and zirconium alloys forming a substrate, an undeformed metal barrier of constant thickness formed of a material selected from the group of niobium, aluminum, copper, nickel, stainless steel and iron metallurgically bonded on the inside surface of the substrate, said metal barrier comprising from about 1 to about 4 percent of the thickness of the cladding container, and an undeformed inner layer of constant thickness formed of zirconium metallurgically bonded on the inside surface of the metal barrier, said inner layer comprising from about 5 to about 15 percent of the thickness of the cladding container, a central core of a body of nuclear fuel material selected from the group consisting of compounds of uranium, plutonium, thorium and mixtures thereof disposed in and partially filling said container and forming an internal cavity in the container, an enclosure integrally secured and sealed at each end of said container, and a nuclear fuel material retaining means positioned in the cavity, said cladding container enclosing said core so as to leave a gap between said core and said cladding during use in a nuclear reactor.

* * * * *